(12) United States Patent
Makimae et al.

(10) Patent No.: US 7,757,367 B2
(45) Date of Patent: Jul. 20, 2010

(54) METHOD FOR TIGHTENING A THREADED FASTENER TO CLAMP A THREAD-CLAMPED MEMBER

(75) Inventors: Tatsumi Makimae, Hiroshima (JP); Yutaka Fujii, Hiroshima (JP); Yuji Narukawa, Hiroshima (JP)

(73) Assignee: Mazda Motor Corporation (JP)

( * ) Notice: Subject to any disclaimer, the term of this patent is extended or adjusted under 35 U.S.C. 154(b) by 1056 days.

(21) Appl. No.: 11/471,495

(22) Filed: Jun. 21, 2006

(65) Prior Publication Data

US 2007/0006444 A1    Jan. 11, 2007

(30) Foreign Application Priority Data

Jul. 11, 2005    (JP)    ............... 2005-201237

(51) Int. Cl.
B23P 11/00    (2006.01)
(52) U.S. Cl. .................. 29/446; 29/525.01; 29/525.11; 403/274
(58) Field of Classification Search .............. 29/525.01, 29/525.11, 407.02, 446; 411/184; 403/274
See application file for complete search history.

(56) References Cited

U.S. PATENT DOCUMENTS

| 6,171,009 | B1 | 1/2001 | Wright |
| 6,668,441 | B1 * | 12/2003 | Gudaitis et al. ............... 29/458 |
| 2004/0027082 | A1 | 2/2004 | Makimae et al. |

FOREIGN PATENT DOCUMENTS

| DE | 10302707 | 9/2003 |
| JP | 3-2905 U | 1/1991 |
| JP | 2000-352453 | 12/2000 |
| JP | 2001-153095 | 6/2001 |
| JP | 2001-200825 A | 7/2001 |
| JP | 2002-168219 A | 6/2002 |
| JP | 2004-074307 | 3/2004 |

OTHER PUBLICATIONS

Japanese OA "Notice of Reasons for Rejection" with mailing date of Nov. 4, 2009; Patent Application No. 2005-201237 with English translation.

* cited by examiner

*Primary Examiner*—Jermie E Cozart
(74) *Attorney, Agent, or Firm*—Studebaker & Brackett PC; Donald R. Studebaker (57) ABSTRACT

A bearing cap, a type of thread-clamped member, is clamped to a cylinder block by flanged hexagonal bolts. The material of the bearing cap is aluminum alloy, while the material of the bolts is steel. The bearing cap has a raised seat the end surface of which provides a bearing surface. The bearing surface of the raised seat has a smaller diameter than the bearing surface of each bolt.

3 Claims, 10 Drawing Sheets

FIG. 4A
Known art (First time)

FIG. 4C
Embodiment (First time)

FIG. 4B
Known art (Second time)

FIG. 4D
Embodiment (Second time)

FIG. 6A
Known art

FIG. 6B
Embodiment

METHOD FOR TIGHTENING A THREADED FASTENER TO CLAMP A THREAD-CLAMPED MEMBER

BACKGROUND OF THE INVENTION (a) Field of the Invention

This invention relates to a threaded fastener tightening method in clamping a member to be clamped to another member using threaded fasteners and a thread-clamped member which is a member to be clamped by the threaded fastener tightening method.

(b) Description of the Related Art

Threaded fasteners, such as bolts and nuts, have been widely used as means for securing parts or other purposes. For example, Unexamined Japanese Patent Publication No. 2001-153095 discloses a structure for securing a cooling fan blade to an end of a rotor shaft using a bolt. In this structure, a plain washer with sufficient rigidity and size is sandwiched between the bolt and the fan blade. Namely, in this structure, the bolt head bears on the top side of the plain washer and the back side of the plain washer bears on the fan blade.

In order to surely clamp a member to be clamped (hereinafter, referred to as a clamped member) using a bolt, a type of threaded fastener, it is necessary to give sufficient axial tension to the stem of the bolt to produce sufficient clamping force. Various methods have been proposed for controlling the axial tension acting on the bolt stem in tightening the bolt. Though the following description is given of control on the axial tension of a bolt in tightening the bolt, the same applies to control on the axial tension of, for example, a stud bolt in tightening a nut against the stud bolt.

Out of the known axial tension control methods, the simplest is a torque control method. The torque control method is a method for controlling a required torque to turn a bolt (a tightening torque). As is generally known, however, approximately 90% of the tightening torque produced in tightening a bolt is consumed by friction between internally and externally threaded surfaces and friction between bearing surfaces and only approximately 10% thereof is used to give an axial tension to the bolt. For example, in the structure disclosed in the above-mentioned Unexamined Japanese Patent Publication No. 2001-153095, almost all of the tightening torque of the bolt is consumed by friction between the bolt bearing surface and the plain washer bearing surface and friction between the internal and external threads. Therefore, it is difficult to control the axial tension acting on the bolt with high accuracy using the torque control method.

On the other hand, an angle control method is known as a method for controlling the axial tension acting on a bolt with high accuracy. This method is one for tightening a bolt using the turning angle (tightening angle) of the bolt as an indicator of the axial tension control.

Figure 9:
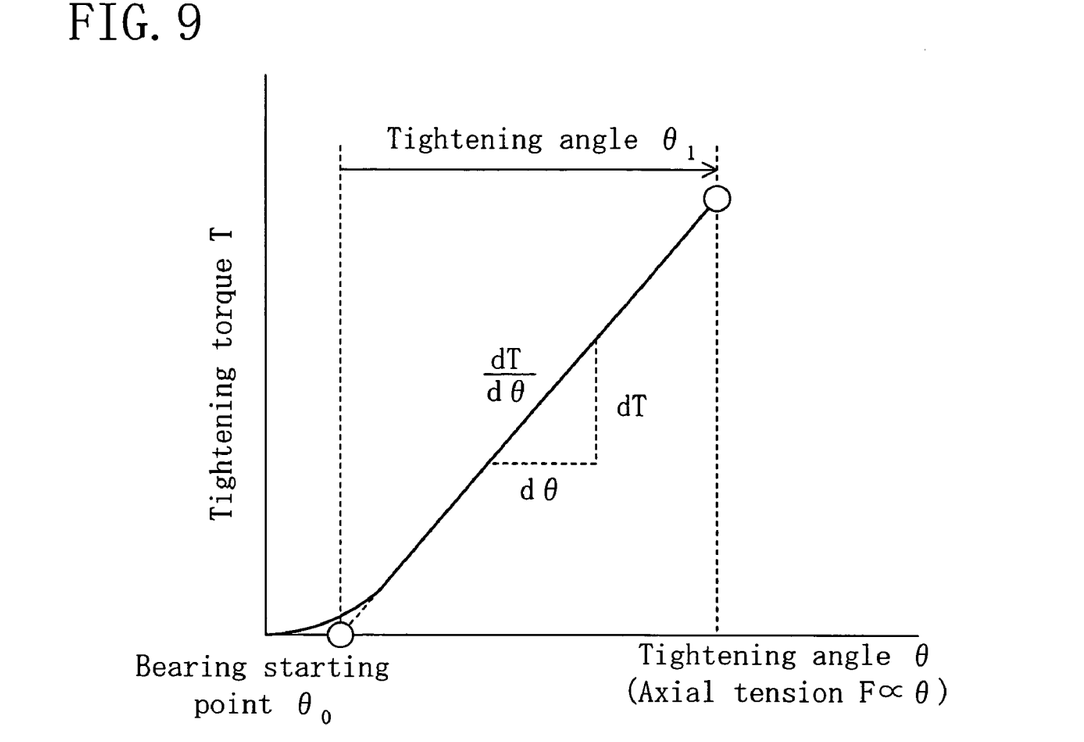

In the angle control method, a particular condition in the course of bolt tightening is selected as a reference point and the bolt is tightened through a predetermined angle from the reference point. Therefore, in order to tighten a bolt by the angle control method, a reference point for measuring the tightening angle of the bolt must be selected. A known method for selecting the reference point is to select as a reference point a condition in which the tightening torque of the bolt reaches a predetermined value. Another known method is to derive an estimated bearing starting point from the gradient of a torque-angle curve showing the relation between the tightening torque and tightening angle of a bolt and select the bearing starting point as the reference point. Such a method is disclosed, for example, in Unexamined Japanese Patent Publication No. 2004-074307 and U.S. Patent Application Publication No. 2004/0027082. In the disclosed method, as shown in FIG. 9, the gradient $dT/d\theta$ of the torque-angle curve is determined in the course of tightening of the bolt and the intersection point between the line of the gradient $dT/d\theta$ and the coordinate of the tightening torque (i.e., the line of T=0) is selected as an estimated bearing starting point $\theta_0$. The bolt tightening is finished when the bolt turns through a predetermined angle $\theta_1$ from the bearing starting point $\theta_0$.

Figure 10A:
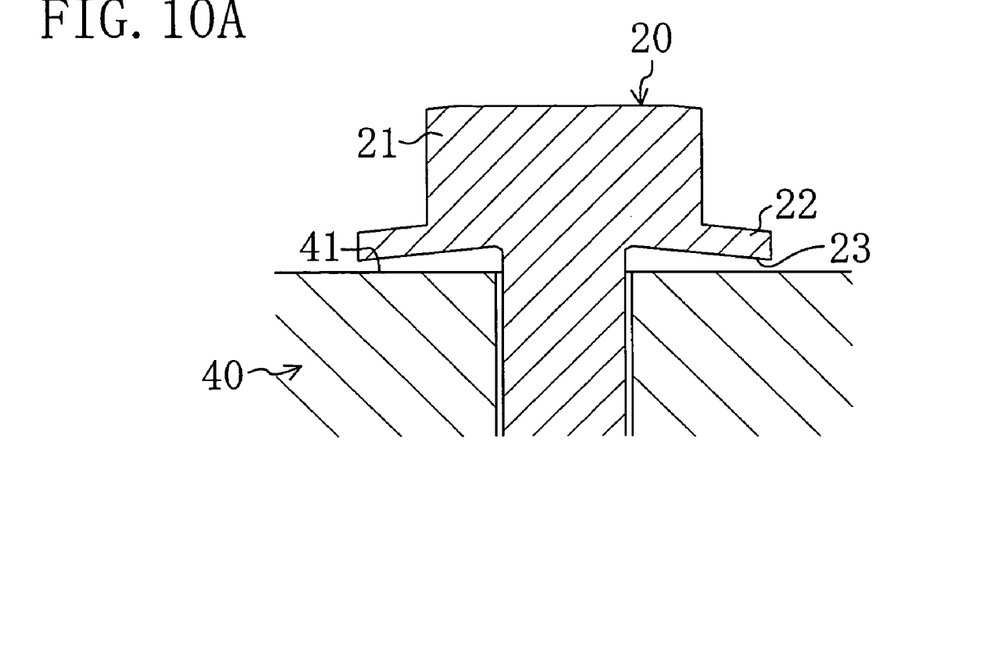
FIGS. 10A and 10B illustrate schematic cross sections of necessary parts of the bolt and the clamped member having almost the same hardness.
Figure 10B:
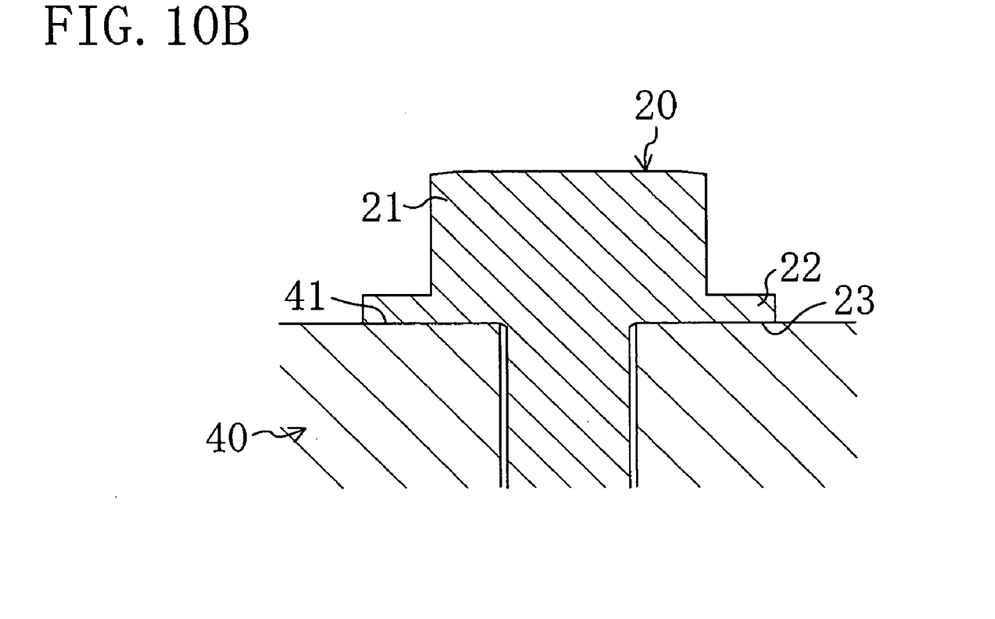

As shown in FIG. 10A, flanged hexagonal bolts in many cases have, not a plain bearing surface, but an inclined bearing surface 23. In these cases, the bearing surface 23 of the threaded fastener 20 has a conical shape radially expanding from the center to the peripheral edge. For example, when a clamped member 40 made of cast-iron is clamped with a flanged hexagonal bolt 20 made of steel, namely, when the bolt 20 has approximately the same hardness as the clamped member 40, the head 21 of the bolt 20 deforms owing to the axial tension acting on the bolt 20 so that the entire bearing surface 23 thereof comes into contact with the clamped member 40 (see FIG. 10B). Therefore, the coefficient $\mu$ of friction between the bolt 20 and the clamped member 40 becomes stabile in the course of tightening of the bolt 20 so that, as shown in FIG. 9, the gradient $dT/d\theta$ of the torque-angle curve becomes substantially constant. As a result, the bearing starting point $\theta_0$ can be accurately determined to control the axial tension on the bolt with high accuracy.

Problem to Be Solved by the Invention

For example, in automotive engines, a large number of aluminium alloy parts have been recently used for the purpose of weight reduction. The aluminium alloy parts have been increasingly clamped by steel bolts accordingly. In these cases, however, there arises a problem that if the clamped member is made of material lower in hardness than the steel bolt, this makes it difficult to control the axial tension on the bolt with high accuracy.

Figure 11A:
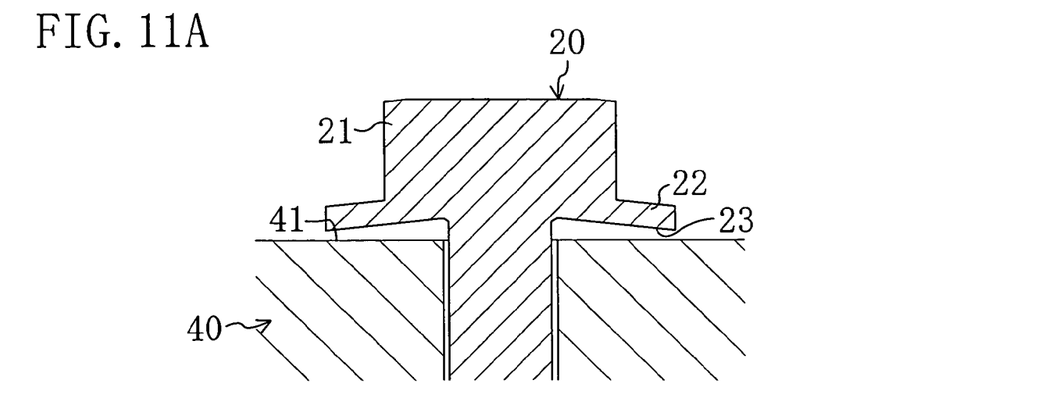
FIGS. 11A, 11B and 11C illustrate schematic cross-sections of necessary parts of a bolt and a clamped member having a lower harness than the bolt when the clamped member is clamped by the bolt in the known art.
Figure 11B:
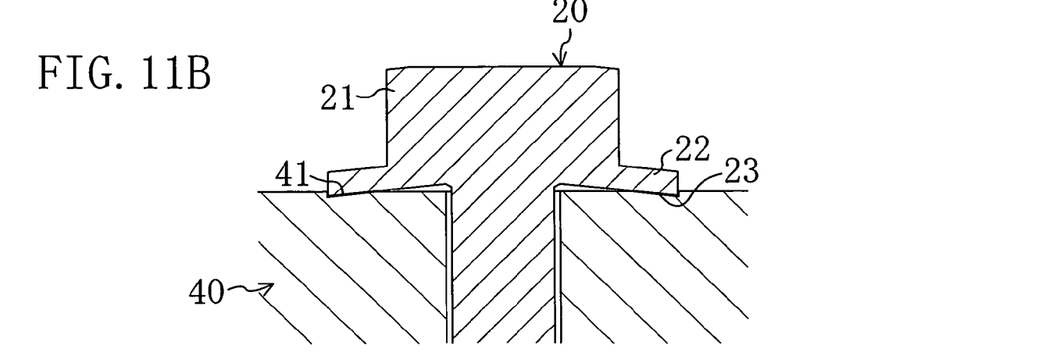
Figure 11C:
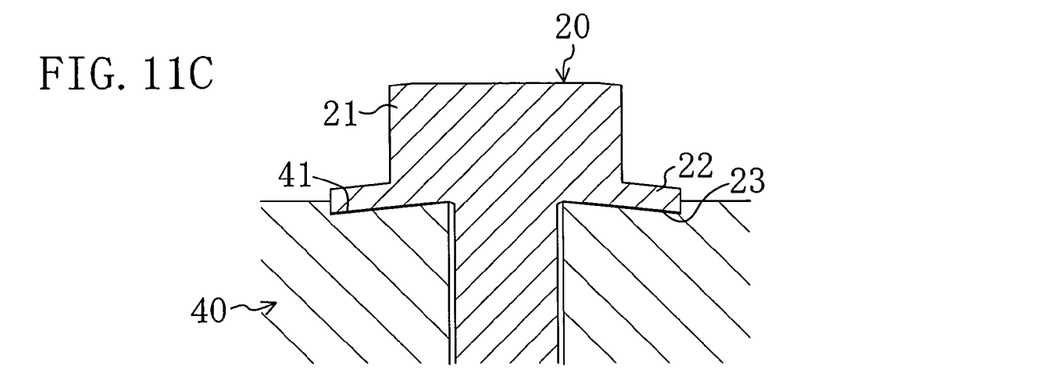

A detailed description is given of the above problem. As shown in FIG. 11, if the material of the clamped member 40 has a lower hardness than that of the bolt 20, the bolt 20 hardly deforms with its tightening but the clamped member 40 deforms instead. In other words, as the bolt 20 is tightened, the clamped member 40 is depressed so that a frictional force acts not only between the bearing surface 23 of the bolt 20 and the clamped member 40 but also between the side surface of a flange 22 of the bolt 20 and the clamped member 40 (see FIG. 11B). In addition, with the turning of the bolt 20, the contact area between the side surface of the bolt 20 and the clamped member 40 gradually increases (see FIG. 11C) and, therefore, the tightening torque consumed by friction between the side surface of the flange 22 and the clamped member 40 also increases.

Figure 12:
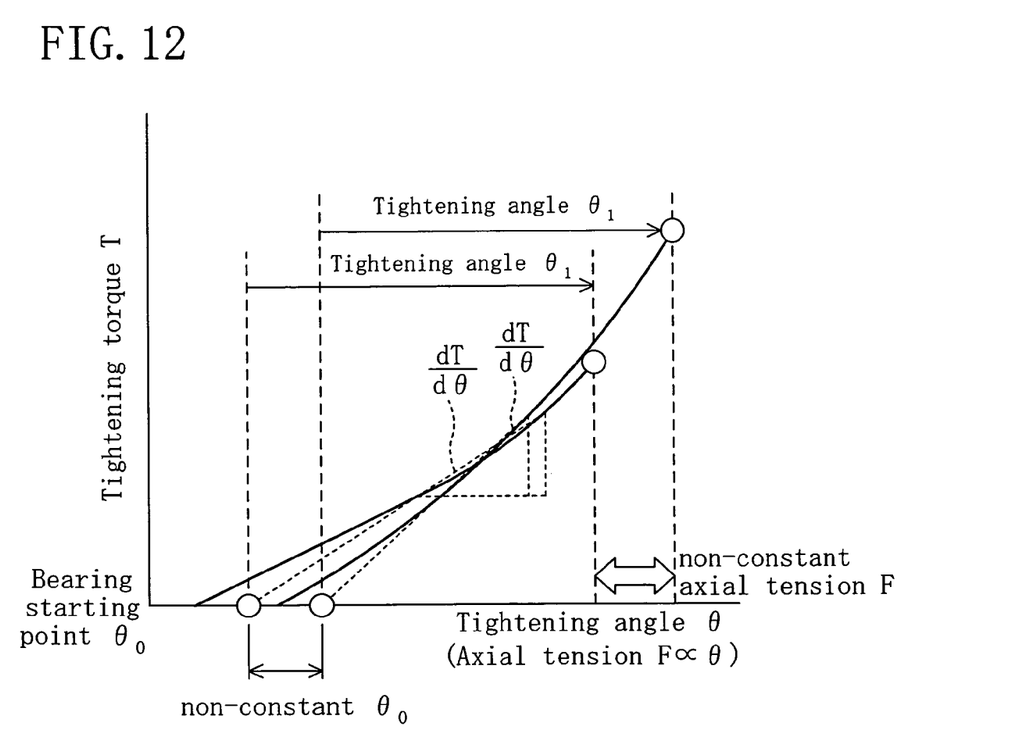
FIG. 12 illustrates torque-angle curves for a bolt when a clamped member having a lower harness than the bolt is clamped by the bolt in the known art.

Therefore, as shown in FIG. 12, even if the tightening torque of the bolt increases, its axial tension does not increase so much and the gradient $dT/d\theta$ of the torque-angle curve changes in the course of the bolt tightening. Further, because bolts do not necessarily have the same bearing surface configuration, their torque-angle curves differ from bolt to bolt. Therefore, even if a bolt is tightened according to any axial tension control method generally considered to be capable of high-accuracy control on axial tension, the change of gradient $dT/d\theta$ of the torque-angle curve during bolt tightening makes it difficult to stably control the axial tension on the bolt. Though the description is given here of the case of tightening a bolt, the same problem occurs also in the case where a nut, another type of threaded fastener, is tightened against a stud bolt or the like.

SUMMARY OF THE INVENTION

With the foregoing in mind, an object of the present invention is to control the axial tension of a threaded fastener with high accuracy even if a thread-clamped member is made of material having a lower hardness than the threaded fastener.

A first aspect of the invention is directed to a method for tightening a threaded fastener in clamping a thread-clamped member to be clamped by the threaded fastener. Further, the threaded fastener is tightened on a bearing surface of the thread-clamped member to clamp the thread-clamped member, wherein the thread-clamped member is made of a material having a lower hardness than the threaded fastener and the bearing surface of the thread-clamped member is formed to have a smaller diameter than that of a bearing surface of the threaded fastener that will be in contact with the bearing surface of the thread-clamped member.

In the first aspect of the invention, the thread-clamped member is made of a material having a lower hardness than the threaded fastener. Therefore, in the course of tightening of the threaded fastener, plastic deformation occurs in a portion of the thread-clamped member in contact with the bearing surface of the threaded fastener.

Further, since in the first aspect the bearing surface of the thread-clamped member has a smaller diameter than the bearing surface of the threaded fastener, the threaded fastener, even when tightened up, is held at its outermost peripheral portion against contact with the thread-clamped member. Therefore, even when the thread-clamped member is plastically deformed by a force applied from the threaded fastener, it comes into contact only with the bearing surface of the threaded fastener. In other words, the side surface of the threaded fastener does not come into contact with the thread-clamped member, neither does a frictional force act between them. Hence, even when the thread-clamped member deforms during the tightening of the threaded fastener, the contact area between the threaded fastener and the thread-clamped member is kept approximately constant and the coefficient of friction between both the members is also approximately constant.

As described above, in the first solution, the thread-clamped member having a lower hardness plastically deforms in the course of tightening of the threaded fastener. Therefore, even if the bearing surface of the threaded fastener is not parallel to the bearing surface of the thread-clamped member, for example, owing to its conical shape, the bearing surface of the thread-clamped member deforms into a shape conforming to the bearing surface of the threaded fastener. Thus, the bearing surface of the thread-clamped member substantially entirely comes into contact with the bearing surface of the threaded fastener. Since the bearing surface of the thread-clamped member conforms to the bearing surface of the threaded fastener, the coefficient of friction between them is kept approximately constant during further tightening of the threaded fastener.

A second aspect of the invention is directed to the first aspect of the invention and characterized in that the bearing surface of the thread-clamped member is formed so that the relation $D_0 < D_1 - (d_0 - d_1)$ holds where $D_0$ is the outer diameter of the bearing surface of the thread-clamped member, $D_1$ is the outer diameter of the bearing surface of the threaded fastener, $d_0$ is the inner diameter of an insert hole open at the center of the bearing surface of the thread-clamped member, and $d_1$ is the outer diameter of a stem formed with external threads and insertable in the insert hole.

In the second aspect, the bearing surface of the thread-clamped member has s shape that satisfies the above relation. In this case, when the stem is passed through the insert hole, the value $(d_0 - d_1)$ obtained by subtracting the outer diameter $d_1$ of the stem from the inner diameter $d_0$ of the insert hole corresponds to the maximum value of the possible relative movement distance between the threaded fastener and the thread-clamped member. Therefore, if the outer diameter $D_0$ of the bearing surface of the thread-clamped member is set smaller than the value obtained by subtracting the value $(d_0 - d_1)$ from the outer diameter $D_1$ of the bearing surface of the threaded fastener, the outermost peripheral portion of the threaded fastener does not come into contact with the bearing surface of the thread-clamped member in any case. Hence, even if the relative position of the threaded fastener and the thread-clamped member is not precisely set, the side surface of the threaded fastener is held against contact with the bearing surface of the thread-clamped member and the coefficient of friction between the threaded fastener and the thread-clamped member is restrained from varying. The stem in the present invention, when the threaded fastener is a bolt, means the stem of the threaded fastener itself but, when the thread fastener is a nut, it means the stem of another element, such as a bolt, screw-engaged with the threaded fastener.

A third aspect of the invention is directed to the first or second aspect of the invention and characterized in that the threaded fastener is made of steel and the thread-clamped member is made of aluminium or aluminium alloy.

In the third aspect, the thread-clamped member is made of aluminium or aluminium alloy having a lower hardness than steel.

A fourth aspect of the invention is directed to the first, second or third aspect of the invention and characterized in that the tightening of the threaded fastener is made according to an angle control method in which a particular condition during the tightening of the threaded fastener is selected as a reference point and the threaded fastener is turned through a predetermined angle from the reference point.

In the fourth aspect, the threaded fastener is tightened according to the angle control method. The angle control method is a tightening method for controlling the axial tension of the stem using the turning angle of the threaded fastener as an indicator. Since in this invention the bearing surface of the thread-clamped member has a smaller diameter than the bearing surface of the threaded fastener, the coefficient of friction between them is approximately constant. Therefore, for example, in the case where the threaded fastener is tightened through a predetermined angle from the time when the tightening torque of the threaded fastener reaches the reference point (snug torque), the axial tension produced at the time when the tightening torque of the threaded fastener reaches the snug torque is almost fixed. Thus, the desired axial tension can be surely obtained by tightening the threaded fastener through the predetermined angle from the reference point. Alternatively, in the case where the threaded fastener is tightened through a predetermined angle from an estimated bearing starting point determined from the gradient of a curve plotted between tightening torque and tightening angle in tightening the threaded fastener, the gradient $dT/d\theta$ of the curve is approximately constant and variations in the bearing starting point are reduced. Thus, the desired axial tension can be surely obtained by tightening the threaded fastener through the predetermined angle from the bearing starting point.

A fifth solution of the invention is directed to the first, second, third or fourth aspect of the invention and characterized in that after the threaded fastener is first tightened, the threaded fastener is loosened and then tightened again.

In the fifth solution, the tightening of the threaded fastener is implemented by a so-called double tightening. If the bearing surface of the threaded fastener is not parallel to the bearing surface of the thread-clamped member, for example, owing to its conical shape, the bearing surface of the thread-clamped member gradually deforms during the first-time tightening of the threaded fastener. During the time, the coefficient of friction between the threaded fastener and the thread-clamped member may slightly vary. When the threaded fastener is tightened for the second time after loosened, however, the bearing surface of the thread-clamped member already has a shape conforming to the bearing surface of the threaded fastener as a result of plastic deformation during the first-time tightening. Therefore, during the second-time tightening, the bearing surface of the thread-clamped member entirely comes into contact with the bearing surface of the threaded fastener from the early stage of the tightening, so that the coefficient of friction between them is almost constant. In other words, during the second-time tightening of the threaded fastener, the coefficient of friction between the threaded fastener and the thread-clamped member is kept substantially constant throughout the course of the tightening.

A sixth aspect of the invention is directed to a thread-clamped member to be clamped to a mounting target by a threaded fastener. Further, the thread-clamped member is made of a material having a lower hardness than the threaded fastener, the thread-clamped member has a bearing surface of that will be in contact with a bearing surface of the threaded fastener, and the bearing surface of the thread-clamped member is formed to have a smaller diameter than the bearing surface of the threaded fastener.

In the sixth aspect, though the thread-clamped member having a lower hardness deforms during the clamping of the threaded fastener with the threaded fastener, since the bearing surface of the thread-clamped member has a smaller diameter than the bearing surface of the threaded fastener, the contact area between the threaded fastener and the thread-clamped member is kept approximately constant during the tightening of the threaded fastener, as described in relation to the first aspect of the invention. Therefore, the coefficient of friction between both the members is also approximately constant, the magnitude of axial tension produced by tightening the threaded fastener is stabilized and the thread-clamped member is surely secured to the mounting target by the threaded fastener.

A seventh aspect of the invention is directed to the sixth aspect of the invention and characterized in that the bearing surface of the thread-clamped member is formed so that the relation $D_0 < D_1 - (d_0 - d_1)$ holds where $D_0$ is the outer diameter of the bearing surface of the thread-clamped member, $D_1$ is the outer diameter of the bearing surface of the threaded fastener, $d_0$ is the inner diameter of an insert hole open at the center of the bearing surface of the thread-clamped member, and $d_1$ is the outer diameter of a stem formed with external threads and insertable in the insert hole.

In the seventh aspect, the bearing surface of the thread-clamped member is formed to have an outer diameter satisfying the above relation. Therefore, as described in relation to the second aspect of the invention, the side surface of the threaded fastener is in any case held against contact with the bearing surface of the thread-clamped member and the coefficient of friction between the threaded fastener and the thread-clamped member is restrained from varying.

An eighth aspect of the invention is directed to the sixth or seventh aspect of the invention and characterized in that the thread-clamped member is made of aluminium or aluminium alloy and configured to be clamped to the mounting target by the threaded fastener made of steel.

In the eighth aspect, the thread-clamped member is made of aluminium or aluminium alloy having a lower hardness than steel.

Effects of the Invention

In the present invention, the thread-clamped member has a lower hardness than the threaded fastener and its bearing surface has a smaller diameter than the bearing surface of the threaded fastener. Therefore, even if the thread-clamped member deforms in the course of tightening of the threaded fastener, the contact area between them can be kept approximately constant and the coefficient of friction between them can also be approximately constant. This provides accurate estimation of the magnitude of axial tension to be produced by tightening the threaded fastener and, therefore, high-accuracy production of a required axial tension to clamp the thread-clamped member. Hence, according to the present invention, a stable clamping force can be obtained and troubles due to the loose of the threaded fastener or like causes can be prevented.

DETAILED DESCRIPTION OF THE INVENTION

Hereinafter, embodiments of the invention will be described in detail with reference to the drawings.

Figure 1:
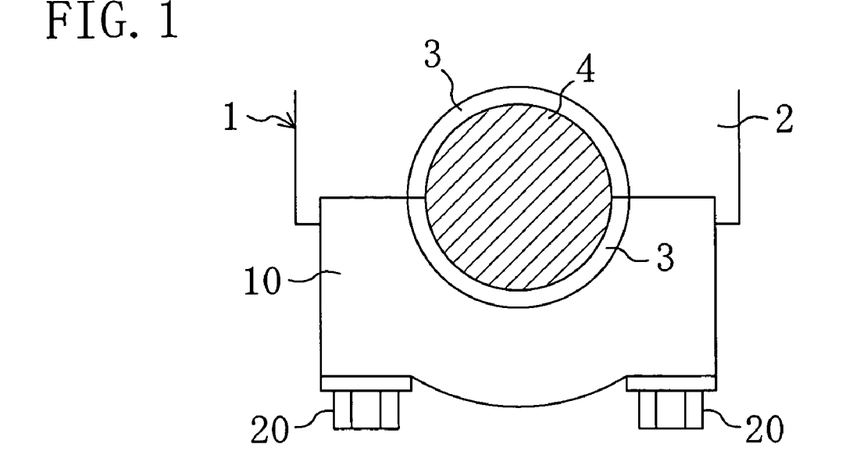
FIG. 1 is a schematic illustration of the structure of a necessary part of an engine to which an embodiment of the present invention is applied.

In an automobile reciprocal engine, as shown in FIG. 1, a crankshaft is pivotally mounted from a cylinder block 1. Specifically, the bottom of the cylinder block 1 is formed into a journal support 2. A bearing cap 10 is mounted to the journal support 2. The bearing surfaces of the journal support 2 and bearing cap 10 have baring metals 3 and 3 respectively attached thereto. Thus, the journal support 2 and the bearing cap 10 form a journal bearing that rotatably supports the main journal 4 of the crankshaft.

The bearing cap 10 is clamped to the journal support 2 by two flanged hexagonal head bolts 20. Each of the bolts 20 that clamps the bearing cap 10 has an external threads formed on its stem 24. The external threads of the bolts 20 are screw-engaged with internal threads formed in the journal support 2. In tightening the bolts 20, a tightening method according to the present invention is used. The screw-engagement between the external threads of each bolt 20 and the corresponding internal threads of the journal support 2 creates a clamping force to secure the bearing cap 10 to the journal support 2.

Figure 2:
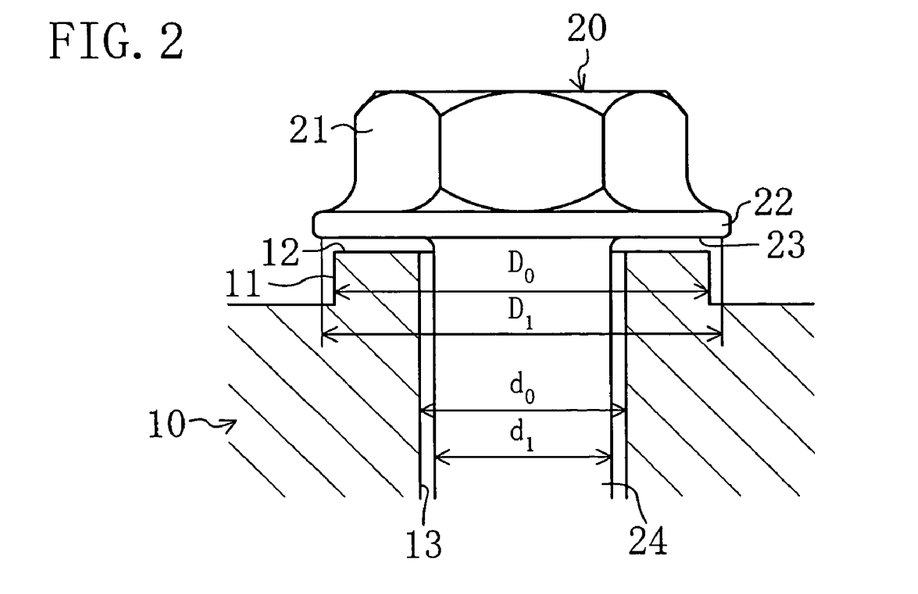
FIG. 2 is an enlarged view of necessary parts of a bolt and a bearing cap in the embodiment of the present invention.
Figure 3A:
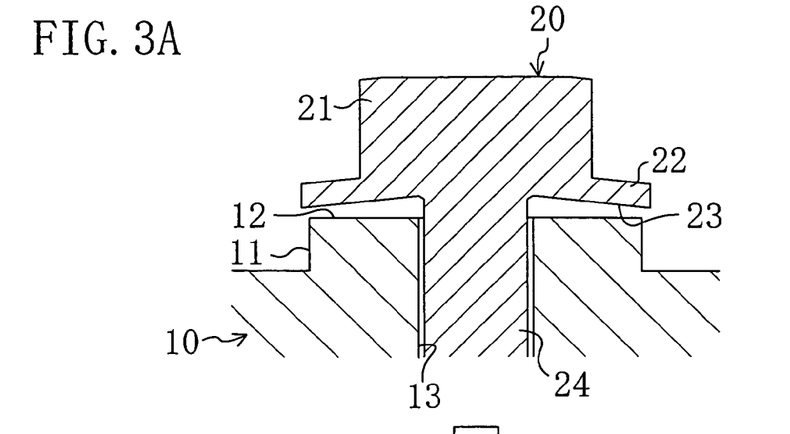
FIGS. 3A, 3B and 3C illustrate schematic cross-sections of the necessary parts of the bolt and the bearing cap in the embodiment of the present invention.

As shown in FIG. 2, each bolt 20 has a stem 24 formed with external threads and a hexagonal head 21 formed at the root end of the stem 24. The bolt 20 is made of steel. The head 21 of the bolt 20 is formed with a collar-like flange 22. The under surface of the flange 22 when viewed in FIG. 2 provides a bearing surface 23. As shown in FIG. 3, the bearing surface 23 of the bolt 20 has a conical shape that radially expands from the root end of the stem 24 to the peripheral edge of the flange 22. In other words, the bearing surface 23 of the bolt 20 is a beveled surface that radially expands from its center to periphery. Note that the position of the bolt 20 in FIGS. 2 and 3 is inverted from that in FIG. 1 and FIG. 3 shows the slope of the bearing surface 23 of the bolt 20 in an exaggerated form.

The bearing cap 10 that is a clamped member constitutes a thread-clamped member according to the present invention. The bearing cap 10 is made of aluminium alloy. Therefore, the bearing cap 10 has a lower hardness than the bolt 20 made of steel. In this embodiment, the journal support 2 of the cylinder block 1 is also made of aluminium alloy, like the bearing cap 10.

The bearing cap 10 is formed with a raised seat 11. The raised seat 11 is raised from the surface of the bearing cap 10 opposite to the journal support 2 and has a substantially cylindrical peripheral surface. Further, the bearing cap 10 is formed with bolt holes 13. The bolt hole 13 is an insert hole for inserting the stem 24 of the bolt 20 therethrough and an open-ended hole of circular section passing through the bearing cap 10 from the raised seat 11 side to the journal support 2 side. The axis of the bolt hole 13 is substantially aligned with the axis of the peripheral surface of the raised seat 11.

The outer diameter $D_0$ of the raised seat 11 of the bearing cap 10 is set to be not less than a lower limit $D_{0min}$ and less than an upper limit $D_{0max}$.

First, a description is given of the upper limit $D_{0max}$ of the outer diameter $D_0$ of the raised seat 11. The upper limit $D_{0max}$ is derived from the following Equation 1, where $D_1$ denotes the outer diameter of the bearing surface 23 of the bolt 20, $d_0$ denotes the inner diameter of the bolt hole 13 and $d_1$ denotes the outer diameter of the stem 24 of the bolt 20.

$$D_{0max} = D_1 - (d_0 - d_1) \qquad \text{<Equation 1>}$$

Since the inner diameter $d_0$ of the bolt hole 13 is always greater than the outer diameter $d_1$ of the stem 24 of the bolt 20, a clearance is created between the inner periphery of the bolt hole 13 and the stem 24 of the bolt 20. Therefore, a possible amount of relative offset of the head 21 of the bolt 20 from the raised seat 11 is $(d_0-d_1)$ at maximum. To cope with this, it suffices if the value of the outer diameter $D_0$ of the raised seat 11 is set smaller than the value obtained by subtracting the value of $(d_0-d_1)$ from the outer diameter $D_1$ of the bearing surface 23 of the bolt 20. In this case, regardless of the relative position of the bolt 20 and the bearing cap 10, the portion of the flange 22 of the bolt 20 radially outwardly of the bearing surface 23 does not come into contact with the raised seat 11.

Next, a description is given of the lower limit $D_{0min}$ of the outer diameter $D_0$ of the raised seat 11. The lower limit $D_{0min}$ is set so that the bearing pressure acting on the bearing surface 12 of the bearing cap 10 owing to the clamping force of the bolt 20 does not exceed a predetermined upper limit (allowable bearing pressure). More specifically, the lower limit $D_{0min}$ is derived from the following Equation 2, where F denotes the axial tension (i.e., clamping force) acting on the bolt 20, $P_{max}$ denotes the allowable bearing pressure of the bearing surface 12, $d_0$ denotes the inner diameter of the bolt hole 13 and the value of $P_{max}$ is set smaller than the yield stress (approximately 300 MPa) of aluminium alloy that is a material of the bearing cap 10.

$$D_{0min} = \{(4/\pi)(F/P_{max}) + d_0^2\}^{1/2} \qquad \text{<Equation 2>}$$

Bolt Tightening Method

In a tightening method of the present embodiment, the bearing cap 10 formed in the above manner is clamped onto the journal support 2 of the cylinder block 1 by bolts 20.

Figure 3B:
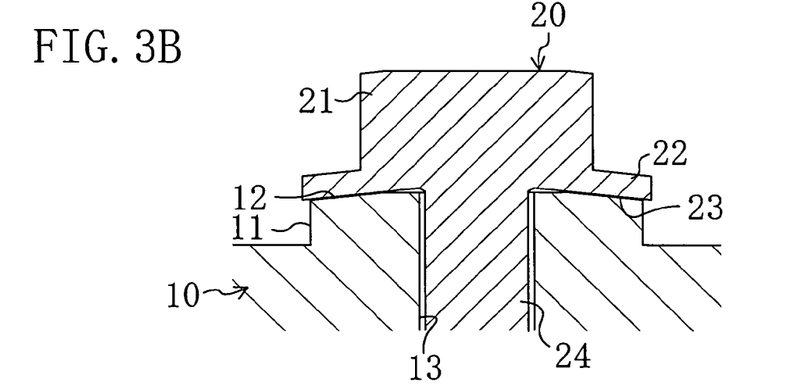
Figure 3C:
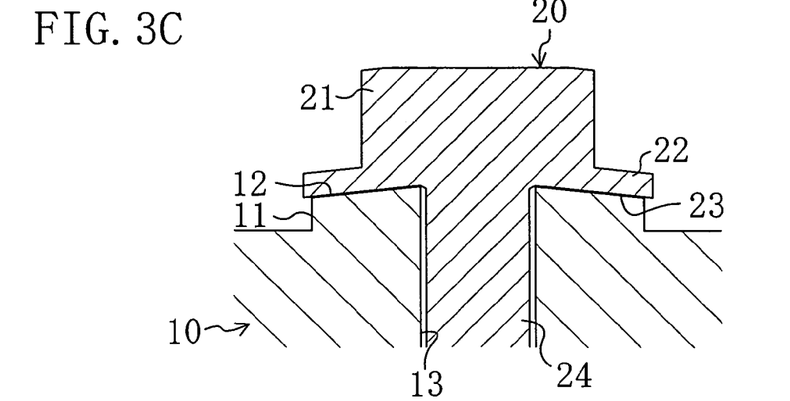

As shown in FIG. 3, when each bolt 20 is tightened some turns, an outer portion of the bearing surface 23 of the bolt 20 first abuts on the bearing surface 12. When the bolt 20 is further tightened, the raised seat 11 lower in hardness than the bolt 20 causes plastic deformation at the point where it abuts on the bearing surface 23 of the bolt 20 (see FIG. 3B). When the bolt 20 is still further tightened, the plastic deformation of the raised seat 11 progresses and, finally, the bearing surface 12 becomes a conical surface conforming to the bearing surface 23 of the bolt 20 and entirely comes into contact with the bearing surface 23 of the bolt 20 (see FIG. 3C). If once the bearing surface 23 entirely comes into contact with the bearing surface 23 of the bolt 20, in spite of still further tightening of the bolt 20, the contact area between the raised seat 11 and the head 21 of the bolt 20 is kept constant and the coefficient $\mu$ of friction between the bearing cap 10 and the bolt 20 is kept substantially constant.

Further, in the tightening method of the present embodiment, the bolt 20 is tightened two times (double-tightened). Specifically, after the bolt 20 is first tightened up, it is loosened and then tightened up again to clamp the bearing cap 10 to the journal support 2.

Figure 4A:
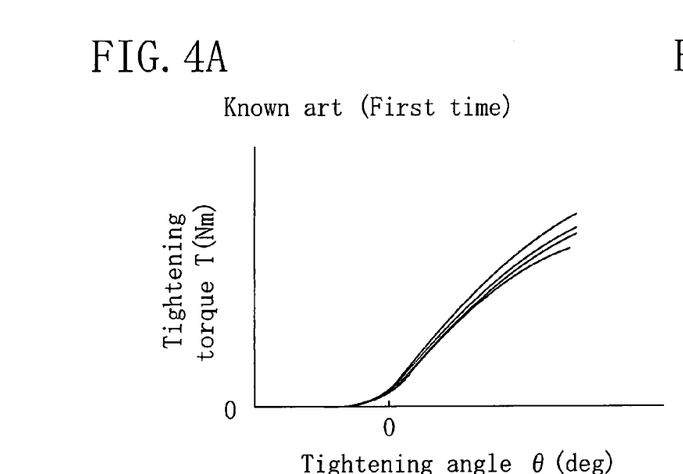
FIGS. 4A, 4B, 4C and 4D illustrate graphs showing relations between tightening torque and tightening angle for various bolts, i.e., torque-angle curves, wherein 4A illustrates torque-angle curves during first-time tightening in a structure of known art, 4B illustrates torque-angle curves during second-time tightening in the structure of known art, 4C illustrates torque-angle curves during first-time tightening in the embodiment of the present invention and 4D illustrates torque-angle curves during second-time tightening in the embodiment of the present invention.
Figure 4B:
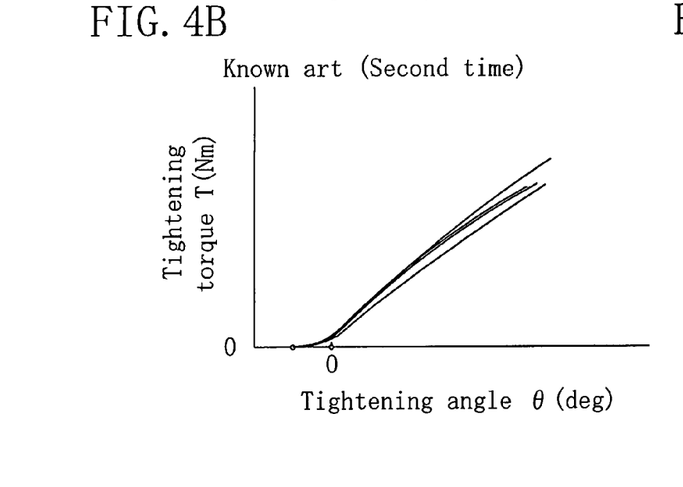
Figure 4C:
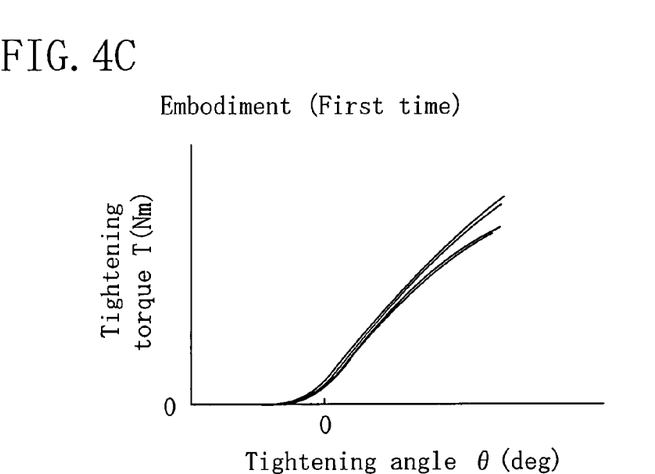

In the course of first-time tightening of the bolt 20, the raised seat 11 causes plastic deformation so that the bearing surface 12 takes on a shape conforming to the bearing surface 23 of the bolt 20 (see FIG. 3). Since plastic deformation occurs in the raised seat 11 during the first-time tightening, as shown in FIG. 4C, the torque-angle curves slightly curve in the range of relatively small tightening angles of the bolts 20.

On the other hand, in the range of relatively large tightening angles of the bolts 20, each bearing surface 12 entirely comes into contact with the bearing surface 23 of the associated bolt 20. Therefore, the torque-angle curves in this case take on almost linear forms so that the tightening torques T in tightening the bolts 20 are substantially proportional to the turning angles (tightening angles) of the bolts 20.

In tightening the bolts 20 for the first time, only the bearing cap 10 is clamped to the journal support 2 without the bearing metals 3 being attached to them. In this state, both the bearing surfaces of the baring member 2 and the bearing cap 10 are concurrently subjected to finish machining. After the completion of machining of the bearing surfaces, the bolts 20 are screwed out and the bearing cap 10 is removed from the journal support 2. Thereafter, the bearing metals 3 and 3 are attached to the bearing surfaces of the journal support 2 and the bearing cap 10, respectively. Then, the main journal 4 of the crankshaft is embraced by the bearing cap 10 and, in this state, the bearing cap 10 is secured again to the journal support 2 by the bolts 20.

Figure 4D:
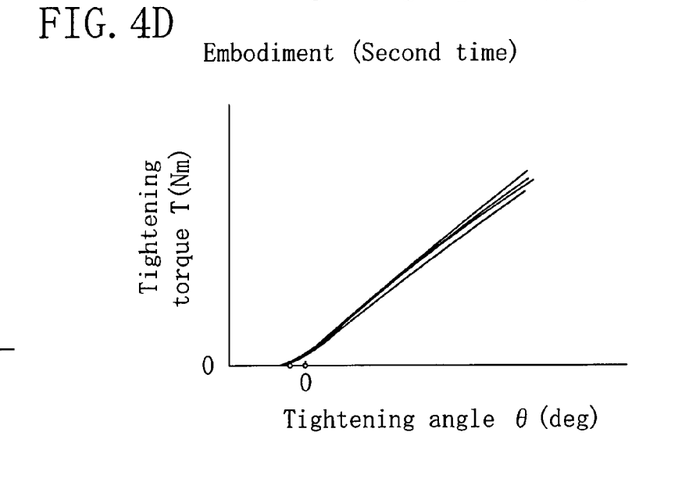

At the start of second-time tightening of each bolt 20, the bearing surface 12 has already taken on a conical shape conforming to the bearing surface 23 of the bolt 20. Therefore, even in the range of relatively small tightening angles $\theta$ of the bolt 20, the bearing surface 12 of the raised seat 11 entirely comes into contact with the bearing surface 23 of the bolt 20. Thus, during the second-time tightening, as shown in FIG. 4D, the torque-angle curves take on approximately linear forms substantially throughout the course of tightening of the bolts 20 so that the tightening torques T in tightening the bolts 20 are substantially proportional to the turning angles (tightening angles) of the bolts 20.

Figure 5A:
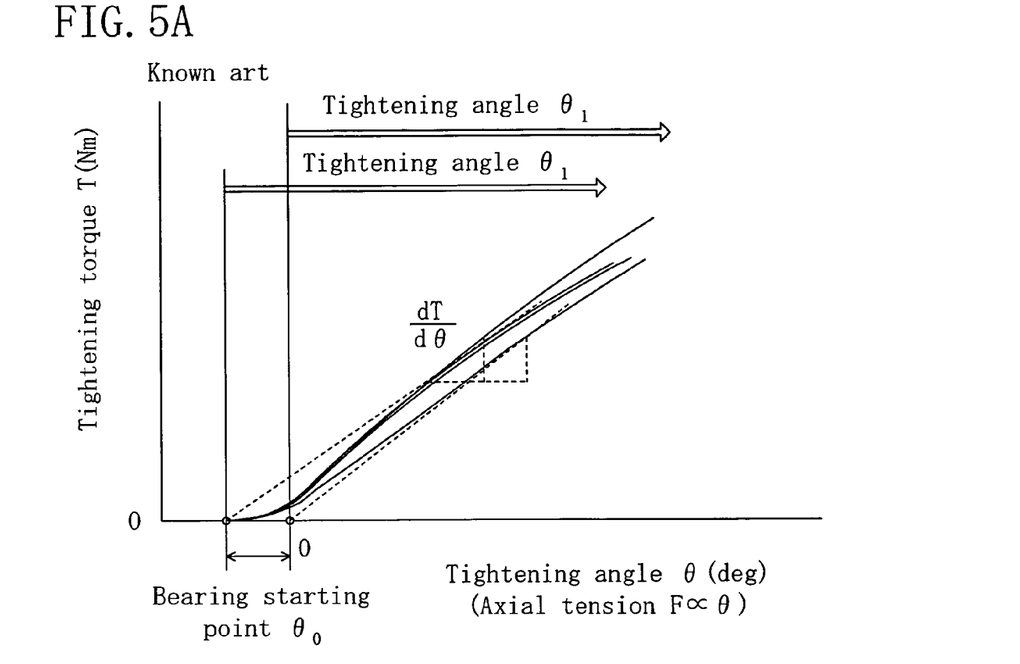
FIGS. 5A and 5B illustrate torque-angle curves for various bolts, wherein 5A illustrates torque-angle curves during bolt tightening in the structure of known art and 5B illustrates torque-angle curves during bolt tightening in the embodiment of the present invention.
Figure 5B:
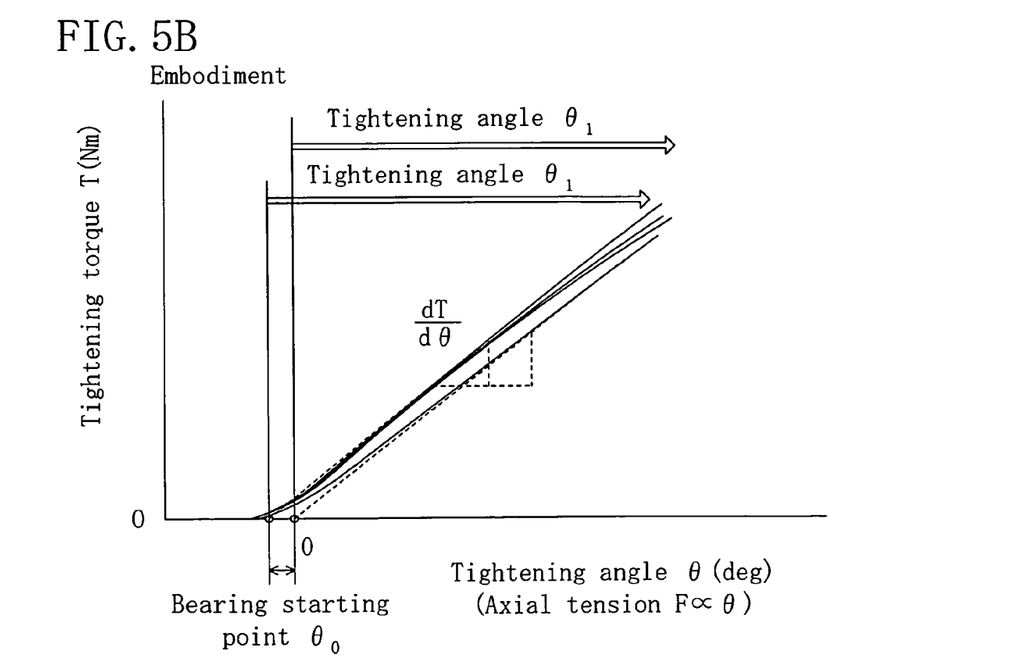

In tightening the bolts 20, each bolt 20 is tightened according to the angle control method using the gradient of the torque-angle curve. As shown in FIG. 5B, while the bolt 20 is being tightened, measurements are made of the tightening angle $\theta$ of the bolt 20 when the tightening torque of the bolt 20 reaches T and the tightening angle $(\theta+d\theta)$ thereof when the tightening torque thereof reaches (T+dT) and the measured values are used to calculate the gradient $(dT/d\theta)$ of the torque-angle curve. Then, the line having the gradient $(dT/d\theta)$ and containing the above two points is determined, the value of the tightening angle when T=0 is derived from the equation expressing the line and the derived value is selected as an estimated bearing starting point $\theta_0$. Then, the tightening of the bolt 20 is completed when the bolt 20 is turned through a predetermined angle $\theta_1$ from the bearing starting point $\theta_0$.

Effects of Embodiment

In this embodiment, each bearing surface 12 of the bearing cap 10 made of aluminium alloy is formed to have a smaller diameter than the bearing surface 23 of the bolt 20. Therefore, when the bolt 20 is tightened, only the bearing surface 23 comes into contact with the bearing cap 10 and, thereby, the contact area between the head 21 of the bolt 20 and the bearing cap 10 can be kept approximately constant. Thus, the coefficient $\mu$ of friction between the head 21 of the bolt 20 and the bearing cap 10 can be approximately constant. Therefore, according to this embodiment, bolts 20 can be prevented from varying in bearing starting point $\theta_0$ from one another, which uniforms the magnitudes of axial tensions produced in bolts 20 with high accuracy.

A further description is made in this respect. In the structure of known art in which the bearing surface 41 of the clamped member 40 is greater than the bearing surface 23 of the bolt 20, if the clamped member 40 has a lower hardness than the bolt 20, the bearing surface 41 of the clamped member 40 is depressed in the course of tightening of the bolt 20 (see FIG. 11), which causes variations in the coefficient of friction between the head 21 of the bolt 20 and the clamped member 40. Therefore, as shown in FIG. 5A, the torque-angle curves during the tightening of the bolts 20 largely curve and are much different from bolt to bolt, so that the bearing starting points $\theta_0$ of the bolts 20 are also much different from bolt to bolt. This makes it difficult to control the tightening of each bolt 20 so that the axial tension that will act on each bolt 20 after the completion of tightening does not vary from bolt to bolt.

In contrast, in this embodiment, since each bearing surface 12 of the bearing cap 10 has a smaller diameter than the bearing surface 23 of the bolt 20, it deforms in the course of tightening of the bolt 20 so that the contact area between the head 21 of the bolt 20 and the raised seat 11 becomes stable (see FIG. 3) and the coefficient of friction between the head 21 of the bolt 20 and the bearing cap 10 is kept almost constant. Therefore, as shown in FIG. 5B, the torque-angle curves during the tightening of the bolts 20 take on substantially linear forms and have small differences from bolt to bolt. This restrains variations in bearing starting point $\theta_0$ between the bolts 20 and makes it possible to almost fix the axial tension that will act on each bolt 20 after the completion of tightening.

Modification 1 of Embodiment

In tightening the bolt 20 in the above embodiment, an angle control method using a snug torque may be employed. In this case, a point of time when the tightening torque of the bolt 20 being tightened reaches a predetermined snug torque is selected as a reference point and the tightening is completed when the bolt 20 is tightened through a predetermined angle from the reference point.

Figure 6A:
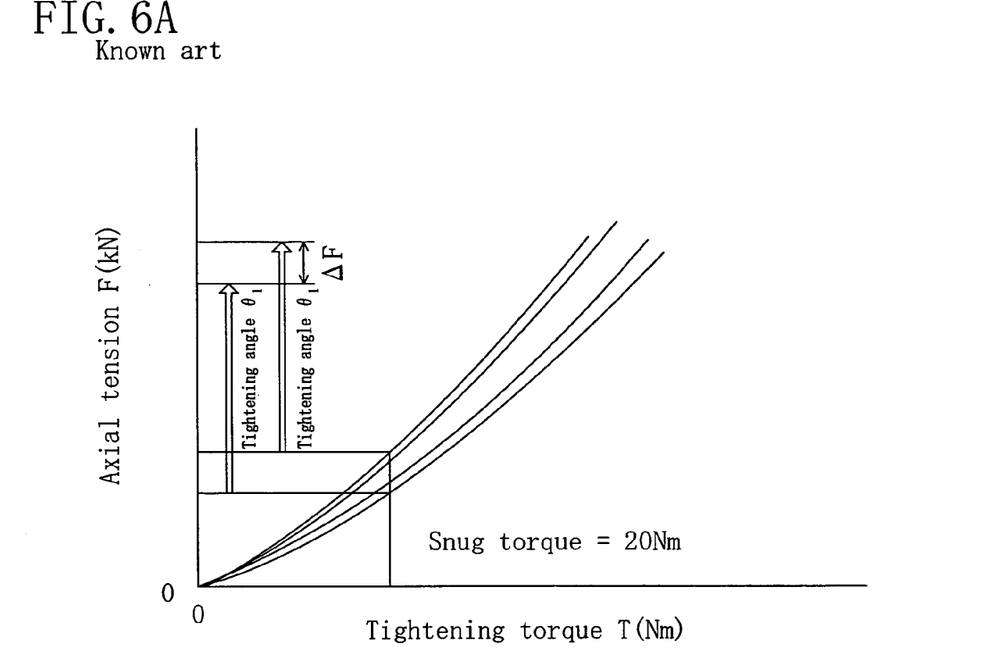
FIGS. 6A and 6B illustrate graphs showing relations between axial tension and tightening torque for various bolts, i.e., tension-torque curves, wherein 6A illustrates tension-torque curves during bolt tightening in the structure of known art and 6B illustrates tension-torque curves during bolt tightening in Modification 1 of the embodiment of the present invention.

As described above, in the structure of known art in which the bearing surface 41 of the clamped member 40 is greater than the bearing surface 23 of each bolt 20, if the clamped member 40 has a lower hardness than the bolt 20, the coefficient of friction between the head 21 of the bolt 20 and the clamped member 40 varies. Thus, as shown in FIG. 6A, the axial tension acting on each bolt 20 when the tightening torque reaches the predetermined snug torque varies greatly from bolt to bolt. Therefore, even if each bolt 20 is then turned through the same angle to complete the tightening, the axial tension produced in each bolt 20 at the time varies greatly from bolt to bolt.

Figure 6B:
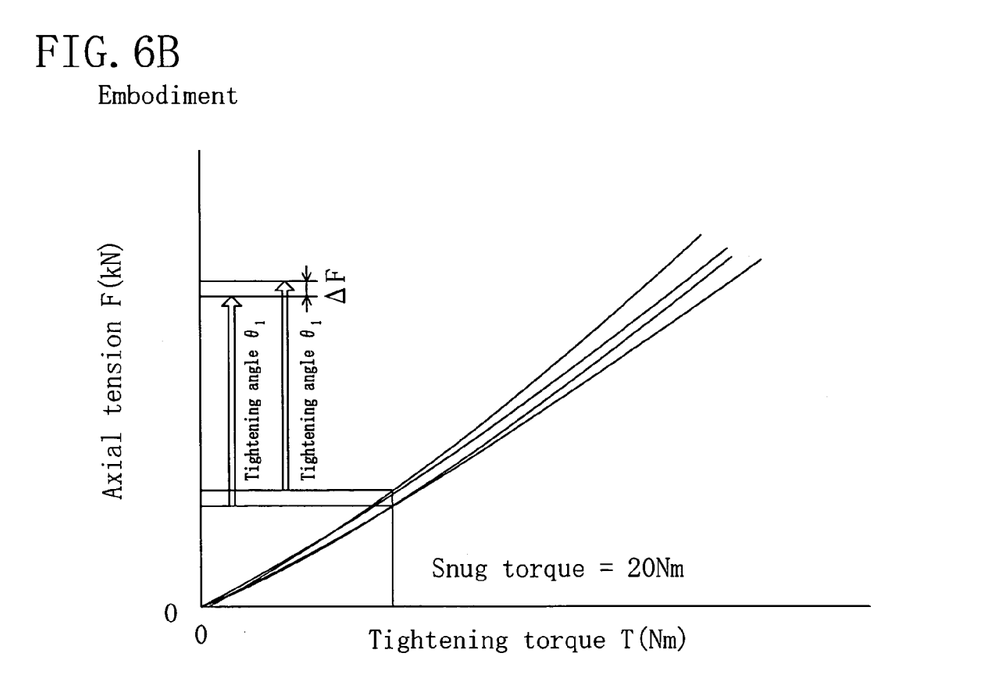

In contrast, in this embodiment, since each bearing surface 12 of the bearing cap 10 has a smaller diameter than the bearing surface 23 of each bolt 20, the contact area between the head 21 of the bolt 20 and the raised seat 11 is kept approximately constant. Thus, as shown in FIG. 6B, the axial tension acting on each bolt 20 when the tightening torque reaches the predetermined snug torque is approximately equal. Therefore, at the time when each bolt 20 is then turned through the same angle to complete the tightening, the axial tension on each bolt 20 also has almost the same value.

Modification 2 of Embodiment

Figure 7:
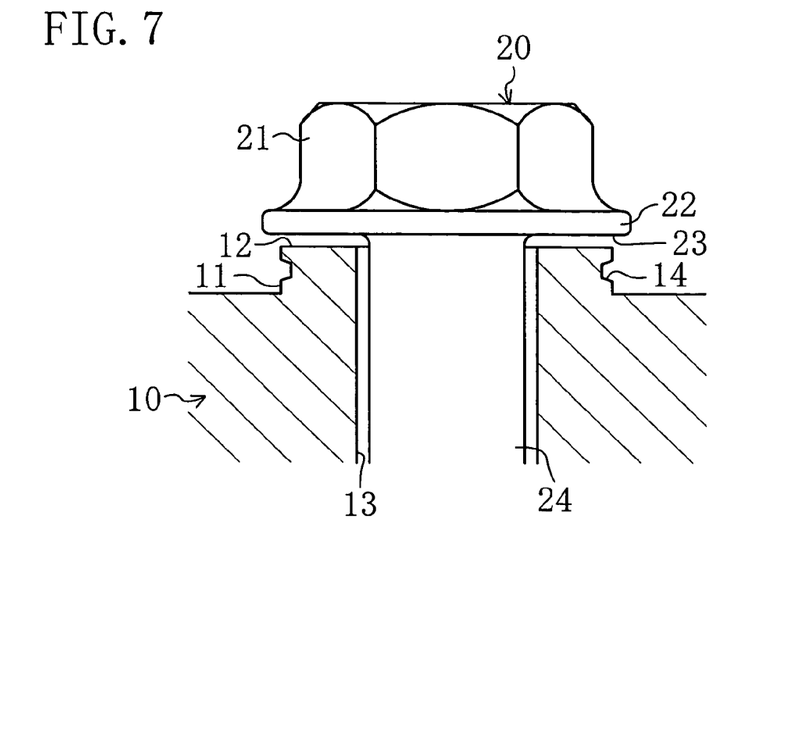

In the above embodiment, as shown in FIG. 7, the raised seat 11 of the bearing cap 10 may be formed with a peripheral groove 14. The peripheral groove 14 is a groove open at and formed throughout the periphery of the raised seat 11.

As described above, the bolt 20 used in this embodiment has a conical bearing surface 23. Therefore, if the bearing surface 23 of the bolt 20 and the raised seat 11 coming into contact with it have the same rigidity, a portion of the raised seat 11 closer to the periphery has a greater bearing pressure when in contact with the bolt 20. In contrast, if the raised seat 11 is formed with a peripheral groove 14 as in this modification, the portion of the raised seat 11 near the periphery is reduced in rigidity. Therefore, as the bolt 20 is tightened, the portion of the raised seat 11 near the periphery causes relatively large elastic deformation. According to this modification, the bearing pressure of the raised seat 11 in contact with the bolt 20 can be uniformed over the entire surface of the raised seat 11, which further stabilizes the coefficient of friction between the head 21 of the bolt 20 and the bearing cap 10.

Other Embodiments

Though in the above embodiment the bearing cap 10 is clamped by bolts 20, the thread-clamped member according to the present invention is not limited to the bearing cap. For example, if the cam cap or the cylinder head of the engine is made of aluminium alloy, the tightening methods in the above embodiment may be used to clamp them by steel bolts 20. That is, the bearing surface of the cam cap or the cylinder head may be formed to have a smaller diameter than the bearing surface 23 of the bolt 20 and the cam cap or the cylinder head may be secured to the cylinder block 1 by the bolts 20.

Figure 8:
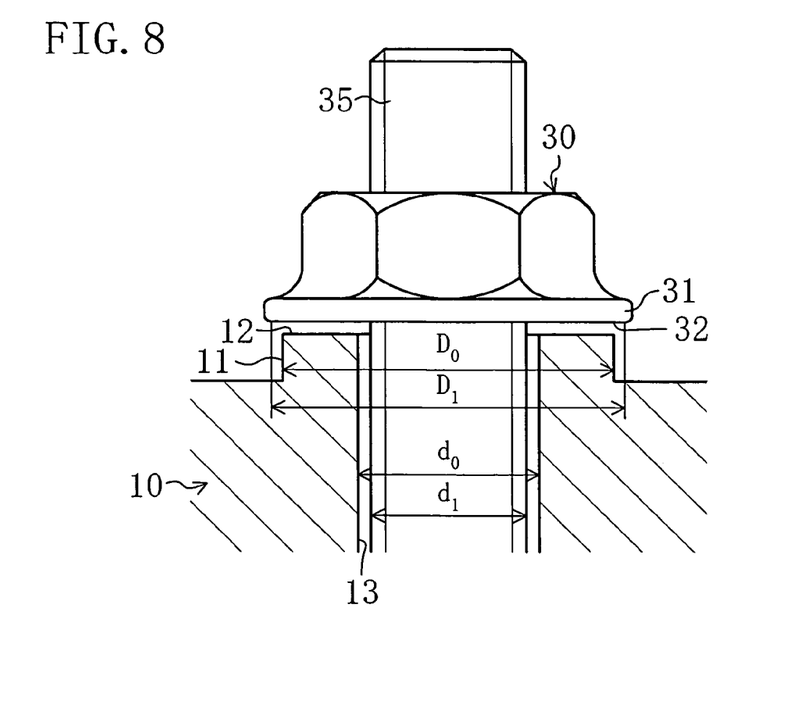

Further, threaded fasteners used in the present invention are not limited to bolts but include nuts formed with internal threads. FIG. 8 shows the case where a flanged hexagonal nut 30 is screw-engaged with a stud bolt 35 inserted through the bolt hole 13. The one end of the nut 30 is formed with a collar-like flange 31 so that the under surface of the flange 31 as viewed in FIG. 8 provides a bearing surface 32. The bearing surface 12 of the raised seat 11 has a smaller outer diameter than the bearing surface 32 of the nut 30. When the nut 30 is tightened, an axial tension acts on the stud bolt 35 and the bearing surface 12 of the raised seat 11 deforms into a shape conforming to the bearing surface 32 of the nut 30.

Furthermore, in the above embodiment, the upper limit $D_{0max}$ of the outer diameter $D_0$ of the raised seat 11 may be set at the same value as the outer diameter $D_1$ of the bearing surface 23 of the bolt 20 so that the raised seat 11 may have an outer diameter $D_0$ less than the upper limit. Also in this case, when the bolt 20 is aligned with the axis of the raised seat 11, the portion of the flange 22 of the bolt 20 radially outwardly of the bearing surface 23 does not come into contact with the raised seat 11.

Furthermore, though in the above embodiment the material of the bearing cap 10 that is a thread-clamped member is aluminium alloy, the material of the thread-clamped member to be clamped by steel bolts 20 is not limited to aluminium alloy but may be aluminium, for example.

The above embodiment should be considered in all respects as illustrative only but not restrictive. The scope of the invention is indicated by the claims but not at all restricted to the description. Further, all modifications and changes which come within the range of equivalents of the claims are intended to be embraced within the scope of the invention.

What is claimed is:

1. A method for tightening a threaded fastener to clamp a thread-clamped member, the method comprising:
   providing a threaded fastener having a bearing surface,
   providing a thread-clamped member made of a material having a lower hardness than that of the threaded fastener,
   the thread-clamped member including a bearing surface having a smaller outer diameter than that of an outer diameter of the bearing surface of the threaded fastener that is to be in contact with the bearing surface of the thread-clamped member,
   initially tightening the threaded fastener to plastically deform a part of the bearing surface of the thread-clamped member that is in contact with the bearing surface of the threaded member;
   loosening the threaded fastener after initially tightening the threaded fastener and causing deformity in the bearing surface of the thread-clamped member; and
   tightening the threaded fastener according to an angle control method after loosening the threaded fastener.

2. The method of claim 1, wherein the bearing surface of the thread-clamped member is formed so that the relation $D_0 < D_1 - (d_0 - d_1)$ holds where $D_0$ is the outer diameter of the bearing surface of the thread-clamped member, $D_1$ is the outer diameter of the bearing surface of the threaded fastener, $d_0$ is an inner diameter of an insert hole open at the center of the bearing surface of the thread-clamped member, and $d_1$ is an outer diameter of a stem formed with external threads and insertable in the insert hole.

3. The method of claim 1, wherein the threaded fastener is made of steel and the thread-clamped member is made of aluminium or aluminium alloy.

* * * * *